United States Patent
Piasentin

(10) Patent No.: US 12,128,518 B2
(45) Date of Patent: Oct. 29, 2024

(54) NUMERICAL CONTROL TOOL MACHINE

(71) Applicant: PROQUADRO S.R.L., Pordenone (IT)

(72) Inventor: Mirko Piasentin, Pordenone (IT)

(73) Assignee: TECNO LOGICA S.R.L., Spresiano (IT)

(*) Notice: Subject to any disclaimer, the term of this patent is extended or adjusted under 35 U.S.C. 154(b) by 432 days.

(21) Appl. No.: 17/601,958

(22) PCT Filed: Apr. 5, 2020

(86) PCT No.: PCT/IB2020/053241
§ 371 (c)(1),
(2) Date: Oct. 7, 2021

(87) PCT Pub. No.: WO2020/208492
PCT Pub. Date: Oct. 15, 2020

(65) Prior Publication Data
US 2022/0187783 A1      Jun. 16, 2022

(30) Foreign Application Priority Data

Apr. 8, 2019   (IT) .......................... 102019000005392

(51) Int. Cl.
 *B23Q 39/04* (2006.01)
 *B23Q 1/66* (2006.01)
 *B23Q 7/14* (2006.01)

(52) U.S. Cl.
 CPC ......... *B23Q 39/044* (2013.01); *B23Q 7/1431* (2013.01); *B23Q 39/046* (2013.01); *Y10T 29/5128* (2015.01); *Y10T 29/5196* (2015.01)

(58) Field of Classification Search
 CPC ............. Y10T 29/5128; Y10T 29/5127; Y10T 29/5196; Y10T 29/5124; B23Q 39/044;
 (Continued)

(56) References Cited

U.S. PATENT DOCUMENTS

| | | | | |
|---|---|---|---|---|
| 2,585,271 A | * | 2/1952 | Praeg ..................... | B21H 5/022 29/38 A |
| 2,953,949 A | * | 9/1960 | Witzig ................. | B23Q 39/046 408/44 |

(Continued)

FOREIGN PATENT DOCUMENTS

| | | | |
|---|---|---|---|
| DE | 419245 C | * | 9/1925 |
| DE | 10119175 A1 | * | 10/2002 |

(Continued)

OTHER PUBLICATIONS

Machine Translation of JP 01-135450 A, which JP '450 was published May 1989.*

(Continued)

*Primary Examiner* — Erica E Cadugan
(74) *Attorney, Agent, or Firm* — Rivka Friedman

(57) ABSTRACT

An improved numerical control tool machine is described comprising:
  a table turnable about an—in use—vertical axis,
  N processing stations, N≥2, arranged around the table,
  a support for a workpiece, the support
    being connected to the table for reaching in sequence the N stations and making the piece be processed thereat,
    comprising locking members for retaining the piece on itself during all the operations performed at the N stations,
  means (50, 60) for connecting the support to the table or releasing it depending on the state of a control input.

10 Claims, 3 Drawing Sheets

Figure 1:
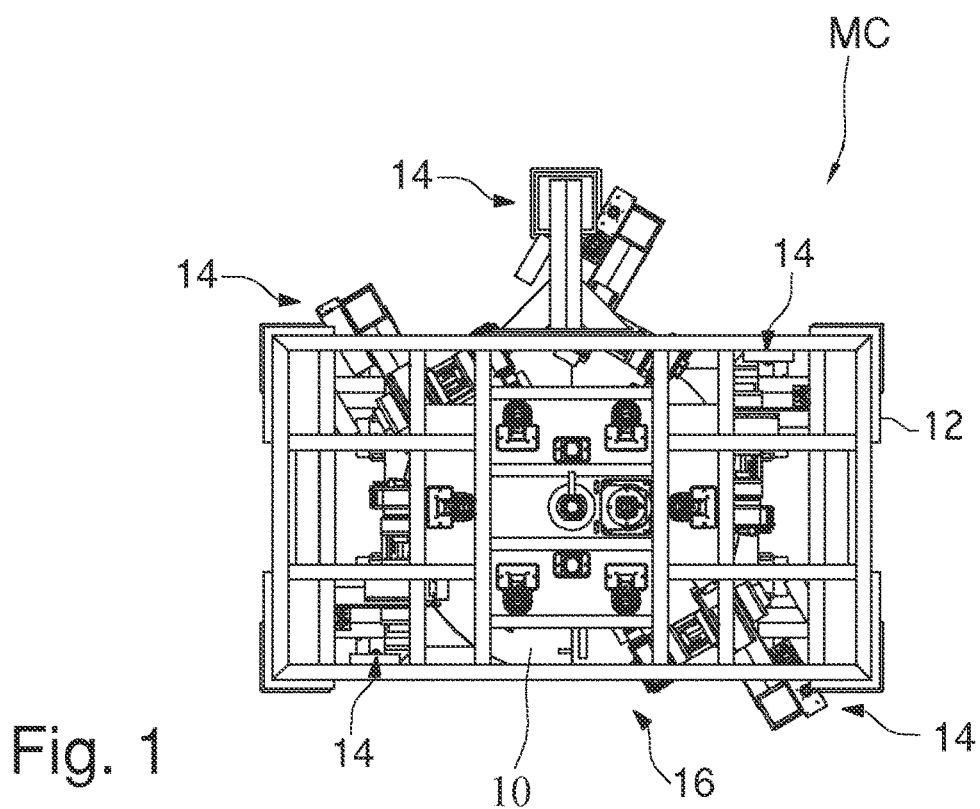

(58) Field of Classification Search
CPC .... B23Q 39/042; B23Q 39/046; B23Q 39/04; B23Q 7/1426–7/1494
USPC .............................. 29/38 A, 38 R, 33 P, 563
See application file for complete search history.

(56) References Cited

U.S. PATENT DOCUMENTS

| | | | | |
|---|---|---|---|---|
| 2004/0040413 A1* | 3/2004 | Gunter | ................ | B23Q 39/042 74/813 R |
| 2004/0057807 A1* | 3/2004 | Bellucci | ............... | B23Q 1/5468 409/159 |
| 2004/0107805 A1* | 6/2004 | Baldini | ................ | B23Q 39/042 29/38 A |
| 2006/0130311 A1* | 6/2006 | Kikuchi | ................... | B23Q 7/02 29/563 |
| 2006/0287174 A1* | 12/2006 | Hansch | ................ | B23Q 7/1431 483/18 |
| 2015/0328735 A1* | 11/2015 | Lutz | .................... | B23Q 39/044 29/38 R |

FOREIGN PATENT DOCUMENTS

| | | | |
|---|---|---|---|
| DE | 202018100761 U1 | 2/2018 | |
| EP | 1136179 A2 * | 9/2001 | |
| EP | 1454711 A1 | 9/2004 | |
| GB | 881123 A | 11/1961 | |
| JP | 01-135450 A * | 5/1989 | |

OTHER PUBLICATIONS

Machine Translation of DE 419245, which DE '245 was published Sep. 1925.*

* cited by examiner

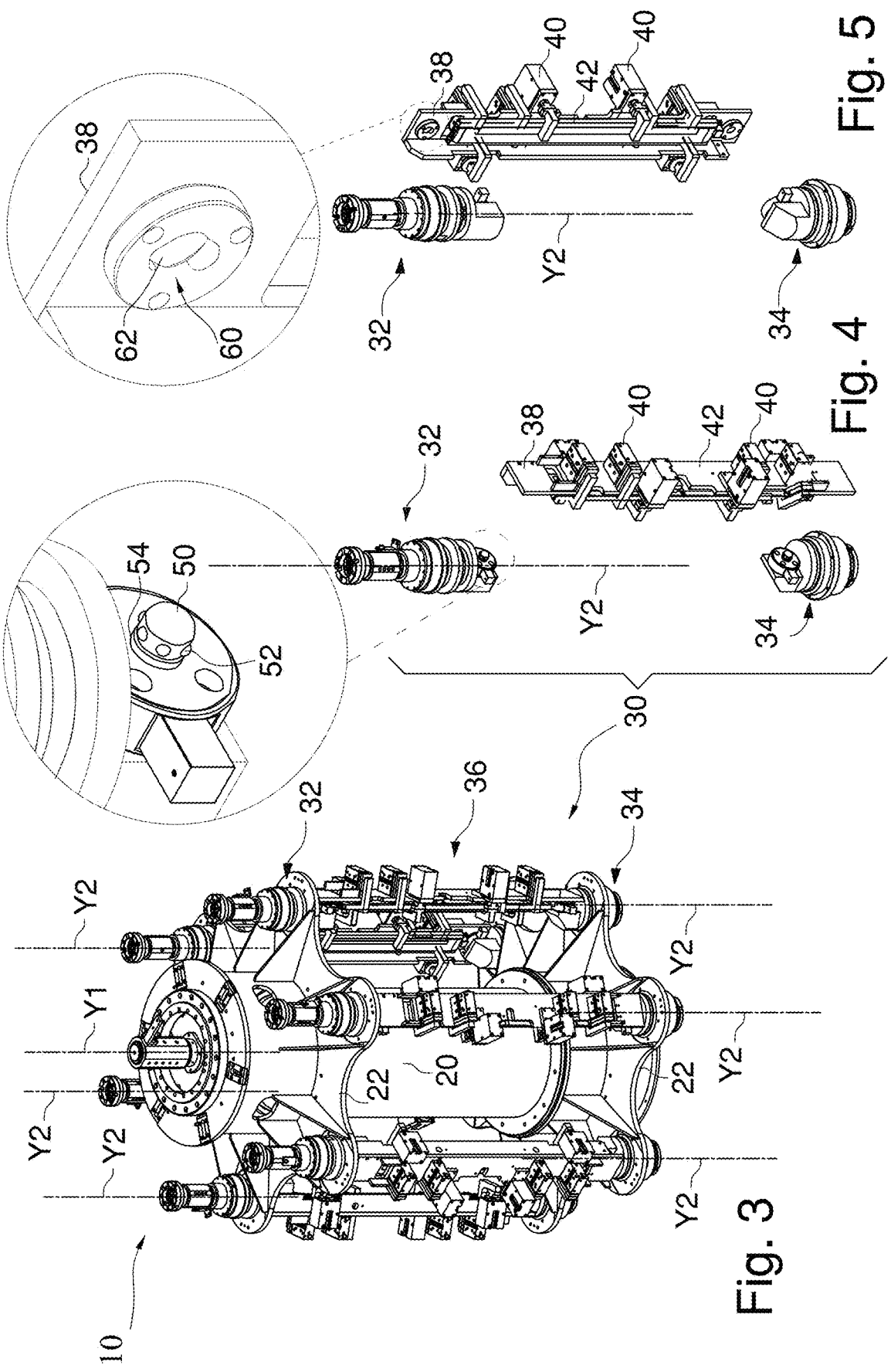

> Numerical Control Tool Machine In Which the Support Mounted on the Table Has A Horizontal Longitudinal Axis

Fig. 6

> Numerical Control Tool Machine In Which the Support Has Pass-Through Openings For Allowing A Tool To Work On The Workpiece By Passing Through The Support

Fig. 7

> Configuration in Which Each of the Means For Connecting Comprises a Cone or a Truncated Cone on The Central Body 36, and Also Comprises a Complementarily-Shaped Cavity On The Corresponding Head

Fig. 8

> Probe For Detecting An Actual Position of the Support on the Table, and Based on the Detected Position, Positional Errors are Compensated For By Modifying a Machining Program Performed by the Tools at the N Stations

Fig. 9

NUMERICAL CONTROL TOOL MACHINE

The present invention relates to a numerical control tool machine.

In numerical control tool machines a felt problem is the reduction of set-up times. At the same time, for high production-volume pieces dedicated machines are designed only (or almost) for the processing of those pieces, so as to specialize at most and speed up the machining operations.

Clearly the versatility of the machine is penalized compared to its production speed. Furthermore, the machine is very expensive, and only gets amortized in many years after a prolonged single-piece production.

The main object of the invention is to improve the present state of the art.

Another object of the invention is to create an improved tool machine able of being equipped faster.

These and other objects are achieved by what is stated in the attached claims; advantageous technical characteristics are defined in the dependent claims.

A numerical control tool machine is proposed comprising:
 a table rotable about an—in use—vertical axis,
 N machining stations, N≥2, arranged around the table,
 a support for a piece to be machined, the support
  being connected to the table to reach in sequence the N stations and to machine the piece thereat,
  comprising locking or clamping members for holding onto itself the piece during all the operations performed in the N stations,
 means or a device (or a clamping device or means) for connecting the support to the table or release it depending on the state of a control input.

By clamping or clamping means an assembly of elements is meant which perform the function of keeping the support and the table united together, or of making them detachable, conditionally on the state of a control input.

The aforesaid means allow changing the supports on the table in a fast manner, avoiding e.g. to fix the supports with screws.

The locking members ensure that the workpiece never leaves the support while it is machined in the N stations, ideal condition for not introducing errors.

Preferably, said means (for connecting) are permanently mounted attached to the support, to simplify the assembly.

The control input may be e.g.
 an electrical signal for controlling the means for connecting,
 the position of a manual control member, or
 a flow of fluid such as air or oil.

According to preferred embodiments, the support extends mainly along a plane and is mounted on the table so that the plane is—in use—horizontal or vertical.

Preferably, in the embodiment with the support arranged horizontal, the table comprises pass-through openings passing from one side thereof to the other, so that a tool can work the piece by crossing the thickness of the table.

Preferably, in the embodiment with the support arranged vertical, the support comprises pass-through openings passing from one side thereof to the other, so that a tool can work the piece by passing through the thickness of the support.

In the embodiment with support placed vertically, preferably the support is mounted on the table so that it can rotate about a vertical axis, parallel to the rotation axis of the table. This degree of freedom for the support not only facilitates the machining of the tool in one of the N stations (also reducing the number of stations), but also the disposal of chips, which fall away from the piece by gravity. Note the remarkable advantage of being able to rotate the support by 180 degrees at each station. The piece can thus show both the upper face and the lower face placed on the support, without the piece having to be re-clamped. The machining of the rear side positioned on the support takes place through the aforesaid pass-through windows or openings arranged in the support itself, through which the operating unit can access. These two aspects contribute synergistically to the efficiency of the machine.

According to a preferred embodiment, the means for connecting comprise two parts connectable together to each other, a first part fixed on the support and a second part fixed part on the table.

According to a preferred embodiment, one of said parts comprises a cone or a truncated cone, and the other part comprises a complementarily shaped cavity.

This system guarantees the mechanically precise and repeatable centering of the support on the table. In addition, the mechanical precision allows limiting the probing operations or measurements on the piece.

According to a preferred embodiment, the first and second parts are configured as male-female parts that can fit one into the other.

According to a preferred embodiment, said means (for connecting) comprise a locking element movable between two positions for respectively constraining or not the first and second part, the position of the movable locking element being controllable by said control input.

According to a preferred embodiment, the machine comprises probing means for detecting the actual position of the support on the table and compensating for positional errors thereof by changing the machining program performed by the tools in the N stations.

Another aspect of the invention relates to a method for operating the aforementioned machine, in one or each of its variants, comprising the steps of
 finishing the production of a series of pieces,
 disconnecting a support from the table by driving the control input of the means for connecting;
 connecting a different support to the table, relative to a different piece than the previous one, by driving the control input of the means for connecting,
 starting the production of a series of said different pieces.

According to a preferred embodiment, the piece is
 an aluminum profile; and/or
 a platform floor or component for a car.

Figure 2:
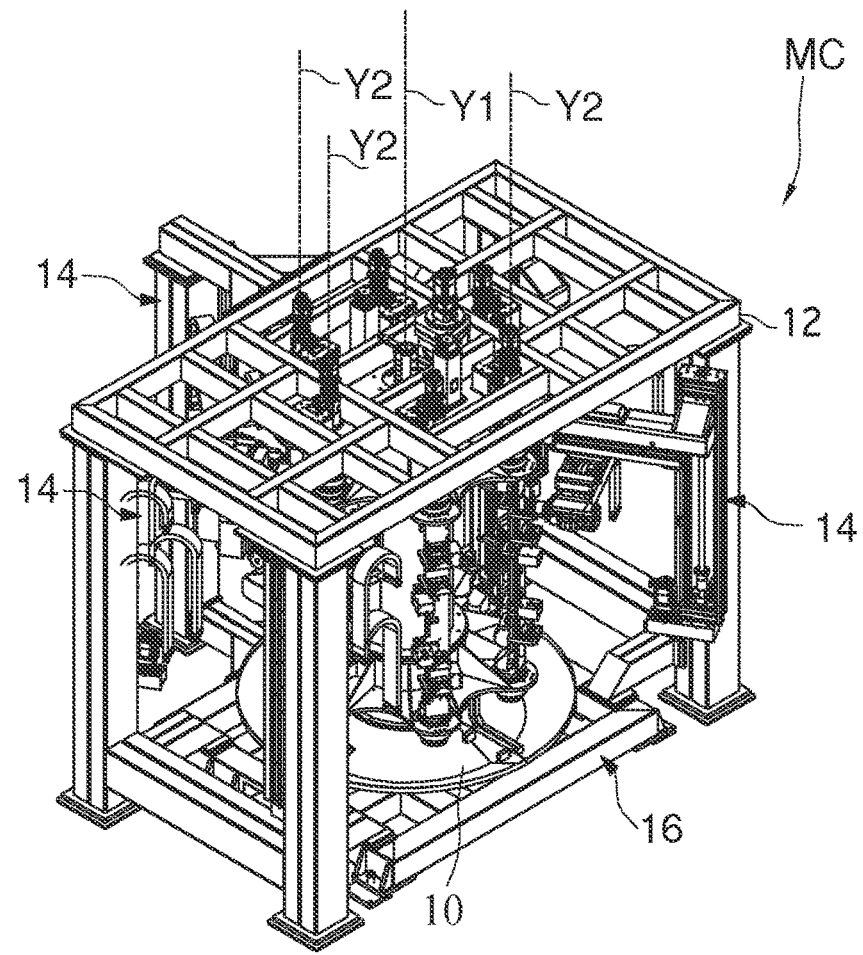

Further advantages will become clear from the following description, which refers to an example of a preferred embodiment of a machine in which:

FIG. 1 shows a top view of the machine;
FIG. 2 shows a three-dimensional view of the machine;
FIG. 3 shows a component of the machine,
FIG. 4-5 show exploded views of components of the machine;
FIG. 6 depicts a variant of the machine;
FIG. 7 schematically depicts a feature of the support;
FIG. 8 schematically depicts a variant of the means for connecting the central body of the support to the heads of the support; and
FIG. 9 schematically depicts a probe.

Equal numbers in the figures indicate equal or substantially equal parts. In order not to crowd the drawings, sometimes same elements are not numbered.

FIG. 1 shows the plan of a numerical control tool machine MC comprising a frame 12 on which a central table is mounted revolving about an axis Y1 which is—in use—vertical.

The frame 12 also houses a plurality of machining stations 14, in the example five, which are equipped with tool and arranged around the table 10. By turning the table 10 about the axis Y1 a piece can be moved in sequence across the stations 14 to be machined therein.

The table 10, shown isolated in FIG. 3, is composed of a central drum 20 from which radially extend two flanges 22 which support, with radial symmetry, supports 30, in the example six in number, for a piece 42.

Particular efficiency was experienced when
  the piece 42 is an automobile component, e.g. a platform to house batteries for electric car; and/or
  the piece 42 is made of aluminum.

The supports 30, shown isolated in FIGS. 4 and 5, extend between the two flanges 22 along a vertical axis Y2 parallel to the axis Y1. The supports 30 are composed by two heads 32, 34 and a central body 36.

The two heads 32, 34, a lower one and an upper one, are fixed respectively on a different flange 22, while the central body 36 protrudes from the drum 20 to bring the piece 42 closer to the tools of the stations 14.

The central body 36 comprises blocking members 40, e.g. pneumatic clamps, to hold the piece 42 thereon during rotation about the axis Y1 and all the machining performed in the stations 14. Preferably the body 36 is rotatable with respect to the heads 32, 34 about the axis Y2 (via a known drive, e.g. an electric motor mounted in the head 32), with the advantage that the piece 42 can also show to the tools of a station 14 the side previously facing the central drum 20.

Advantageously, the central body 36 is fixed to the two heads 32, 34 via a quick-release connection. For this purpose the body 36 comprises anchoring means to the heads 32, 34 which can be activated/deactivated in dependency of the state of a control input. By being able to change the bodies 36 on the table 10 the machine MC can be quickly equipped for a new piece, thus becoming very flexible as well as usable in low or medium volume production lines.

The anchoring means in the illustrated variant comprise two facing parts which can couple on command: a fixed part on the heads 32, 34 and a fixed part on the body 36.

The fixed part on the heads 32, 34 comprises (FIG. 4) a protruding pin 50 equipped with a conical portion 54 and radial pins 52 capable of protruding more or less from the lateral surface of the pin 50.

The fixed part on the body 36 comprises (FIG. 5) a disk 60 with a cavity 62 complementary to the pin 50 and to the conical portion 54. Complementarity between conical shapes ensures good centering. In the cavity 62 there are holes complementary to the pins 52.

The pin 50 and the cavity 62 are configured as male-female parts that can be fitted into each other. To attach the body 36 to the heads 32, 34, and therefore to the table 10, the body 36 is moved horizontally near the heads 32, 34 so that the pin 50 inserts into the cavity 62 and, for example through an input of compressed air or oil, the pins 52 are controlled to come out from the pin 50 and enter the corresponding holes in the cavity 62, in order to join the body 36 and the heads 32, 34 together.

An operating method for machining a piece 42 with the machine MC comprises the steps of
  mounting a piece 42 onto the body 36,
  blocking it on the body 36 by operating the clamps 40,
  rotating the table 10 to bring the piece 42 sequentially in front of the tools of each station 14,
  optionally, rotating the body 36 around the axis Y2 at a or each station 14 for exposing and machining a different side of the piece 42,
  unloading a piece 42 from the body 36 when it has circulated through all the stations 14 and loading another piece.

By construction, a support 30 is dedicated to the piece to be machined, or it is however not possible to load onto the support 30 any piece.

An operating method with the machine MC to change the type of pieces to be machined, comprises e.g. the steps of
  commanding the control input of the pins 52 to disengage a body 36 from the heads 32, 34 of the table 10;
  removing, e.g. with a forklift or a robot or a lifting carriage, the body 36 from table 30,
  connecting to the heads 32, 34, e.g. with a forklift or a robot or a lifting carriage, a different body 36 relating to a different piece from the previous one, e.g. taking the different body 36 from a storage,
  commanding the pins 52 to anchor the new body 36 to the heads 32, 34.

Thus the production of a series of different pieces can begin.

The invention claimed is:

1. Numerical control tool machine comprising:
  a table turnable about a vertical axis, the table comprising a drum, an upper flange, and a lower flange;
  N processing stations, N≥2, each of the processing stations comprising a respective tool and being arranged around the table;
  a support for a workpiece, the support comprising an upper head, a lower head, and a central body, the upper head being fixed on the upper flange, and the lower head being fixed on the lower flange;
  wherein the support is connected to the table so as to be turnable about the vertical axis to reach, in a sequence, each of the N stations such that the workpiece is processed at each of the N stations by the respective tool thereof;
  wherein the central body comprises locking members for releasably retaining the workpiece on the central body during all the processing operations performed at the N stations;
  the numerical control tool machine further comprising controllable means for selectively connecting the central body to the upper and lower heads and releasing the central body from the upper and lower heads.

2. Machine according to claim 1, wherein the support is mounted on the table so that a longitudinal axis of the support is horizontal or vertical.

3. Machine according to claim 1, wherein the support comprises pass-through openings passing from one side of the support to another, so that a given one of the tools can work the workpiece by passing through a thickness of the support.

4. Machine according to claim 1, wherein the support is mounted on the table so as to be able to rotate about a vertical axis, parallel to the rotation axis of the table.

5. Machine according to claim 1, wherein the means for connecting comprise two parts which are connectable together, wherein the two parts comprise: (i) a first part fixed on the central body of the support and (ii) a second part fixed on one of the upper head and the lower head.

6. Machine according to claim 5, wherein one of said first and second parts comprises a cone or truncated cone, and the other of said first and second parts comprises a cavity of complementary shape.

7. Machine according to claim 5, wherein said means comprise a locking element controllable so as to be movable between two positions to constrain the first and second parts.

8. Machine according to claim 1, comprising a probe for detecting an actual position of the support on the table, wherein based on the detected position, positional errors are compensated for by modifying a machining program performed by the tools at the N stations.

9. Method for operating the machine according to claim 1, comprising the steps of
- finishing the production of a series of the workpieces,
- disconnecting the central body from the table by providing a command to the means for connecting;
- connecting a different support to the table, which different support is holding a different workpiece from the previous one, by providing a command to the means for connecting,
- starting the production of a series of said different pieces.

10. Method according to claim 9, wherein the workpieces comprise an aluminum profile; and/or wherein the workpieces comprise a platform; or wherein the workpieces comprise a component for an automobile or vehicle.

* * * * *